Patented Apr. 10, 1928.

1,665,580

UNITED STATES PATENT OFFICE.

ALEX BROOKING DAVIS, OF CINCINNATI, OHIO, ASSIGNOR TO A. B. DICK COMPANY, OF CHICAGO, ILLINOIS, A CORPORATION OF ILLINOIS.

MANUFACTURE OF STENCIL SHEETS.

No Drawing.    Application filed May 20, 1926. Serial No. 110,571.

This invention relates to stencil sheets, and more particularly relates to the stencilizable coating thereof, to the process of compounding the same, and to the materials of the composition. The principal object of my invention includes the provision of an improved stencil sheet. Another object of my invention is to provide a new type of chemical substances which may be used with advantage in compounding a stencilizable coating for stencil sheets. A further object of my invention is to provide a process for utilizing chemical substances of this new type for stencil coating purposes. Other objects of my invention will be in part obvious and in part pointed out hereinafter.

Of the numerous types of stencil sheets which have been prepared, one of the most important groups of collodial substances which are applicable for this work are the carbohydrates and their esters. Among the carbohydrate compounds which I have found suitable for the purpose are the esters of various substances in the group commonly classed as carbohydrate gums. The organic acid esters of gum tragacanth may be mentioned to illustrate the type of substance referred to, and among these I am somewhat partial to the acetyl derivatives thereof. The empirical formula commonly given for this substance is $C_6H_{10}O_5$.

These substances possess a number of free hydroxyl groups, and therefore combine readily with fatty acids to form esters. Acetic acid is particularly applicable in this instance.

Acetyl derivatives of gum tragacanth, so far as I am aware, are totally new and not previously described in any available literature, and may be prepared as follows:

100 grams powdered gum tragacanth is suspended in 600 grams of glacial acetic acid, 40 grams acetic anhydride and 5 cc. of 95% sulphuric acid. This mixture is heated on the steam bath for one hour.

210 grams of acetic anhydride is then added and stirred in. The mass becomes very viscous.

The product is heated for ½ hour at water bath temperature and then 150 cc. of 50% acetic acid is added. After another ½ hour's heating, the ester is precipitated by pouring into water with stirring. The product is well washed and dried at 80 degrees C.

The yield of dry acetyl derivative from 100 grams of gum tragacanth is approximately 125 grams, and the material appears as an amorphous, yellowish, horn-like mass. The substance is tragacanth acetate. The sulphuric acid acts as a catalyzer.

It is well known that in the preparation of fatty acid esters of compounds of the carbohydrate series, their solubilities and properties vary materially according to the degree of esterification, and I do not restrict myself to the particular kind of tragacanth acete obtained by operating as above described, for varying proportions of acetic acid and acetic anhydride, the time of heating and other methods of treatment well known in the art of forming esters of carbohydrates, will produce tragacanth esters of varying properties, any one of which may be suitable for the purposes of this invention.

The manufacture of stencils from this product is very simple, and the process is easily performed as follows:

Tragacanth acetate is only slightly soluble in most organic solvents, but readily soluble in ethyl formate, and for my purpose, I prefer this solvent as it is fairly inexpensive, highly volatile and readily obtainable. The powdered tragacanth acetate is dissolved in ethyl formate to a 5% solution. This solution has the consistency of a thin syrup and is a highly dispersed collodial mass.

To 200 grams of this 5% solution, there is added 75 grams of mono benzoyl butyl tartrate, on which I have a patent pending, filed February 5, 1926, Serial No. 86,343. Upon stirring, this mixture yields a stencil coating mass capable of giving continuous films upon porous base sheets such as Japanese yoshino, and stencils are readily prepared therefrom by drawing through or floating over the surface of the mass sheets of Japanese yoshino paper or other suitable porous base sheets, the excess material being scraped off by a wire, and the sheets then hung up to allow the volatile solvent to evaporate. This takes place very rapidly, and after a short time the sheets possess a continuous and homogeneous film which is readily type and stylus impressible, and stencils made therefrom are capable of yielding numerous copies when used with the usual types of duplicating machines.

Other organic fatty acid esters of carbohydrate gums in general may be utilized in a similar manner for the preparation of similar stencil coating masses, and the above specific example will serve for all.

Obviously, the above operation may be varied by the use of different solvents; thus, methyl formate may in some measure replace ethyl formate, and methyl acetate may also be used. Acetone mixed with other solvents may also be use to advantage. Also, dibutyl tartrate mixed with other esters, such as the esters of phthalic acid, may replace mono benzoyl butyl tartrate as a modifying and distending agent. Fats, oils, waxes and resins dissolved in suitable solvents may also be compounded with the mass to advantage, and for the purpose of this invention, I desire to cover broadly the method of modifying and character of modifying and distending agents.

It is obvious also that the closer related products, such as acetyl derivatives of gum arabic and gum karaya, can readily yield fatty esters of a similar character.

The stencil as described above is nearly white and it is difficult to see the marks of the type or stylus upon such stencils, but color and opacity may be lent by dissolving into the mass or suspending therein suitable dyestuffs or dry colors of any desirable shade.

The stencils produced by this process, and from the new type of chemical substance disclosed above, possess good strength, are apparently little acted upon by the usual forms of duplicating inks and do not change materially upon standing for long periods.

Now having described my invention, what I claim is:

1. A type and stylus impressible stencil sheet consisting of a porous base sheet coated with a homogeneous film including the fatty acid ester of a carbohydrate gum.

2. A type and stylus impressible stencil sheet consisting of a porous base sheet coated with a homogeneous film including tragacanth acetate.

3. The process of manufacturing a type and stylus impressible stencil sheet, consisting of depositing upon a suitable porous base sheet a homogeneous film including tragacanth acetate.

4. The process of manufacturing a type and stylus impressible stencil sheet, consisting of depositing upon a suitable porous base sheet a homogeneous film including an organic acid ester of tragacanth gum.

5. The process of manufacturing a type and stylus impressible stencil sheet, consisting of depositing upon a suitable porous base sheet a homogeneous film including the fatty acid ester of a carbohydrate gum.

This specification signed this 14th day of May, 1926.

ALEX BROOKING DAVIS.